United States Patent
Rai

(10) Patent No.: US 12,034,683 B2
(45) Date of Patent: *Jul. 9, 2024

(54) EMOJI RECOMMENDATION SYSTEM AND METHOD

(71) Applicant: Woofy, Inc., New York, NY (US)

(72) Inventor: Arjun Rai, New York, NY (US)

(73) Assignee: Woofy, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,088

(22) Filed: Mar. 29, 2023

(65) Prior Publication Data
US 2023/0239262 A1    Jul. 27, 2023

Related U.S. Application Data

(63) Continuation of application No. 17/388,614, filed on Jul. 29, 2021, now Pat. No. 11,646,984, which is a continuation of application No. 16/684,049, filed on Nov. 14, 2019, now Pat. No. 11,115,356.

(51) Int. Cl.
*G06F 16/17* (2019.01)
*G06F 40/205* (2020.01)
*H04L 51/046* (2022.01)
*H04L 51/52* (2022.01)

(52) U.S. Cl.
CPC .......... *H04L 51/046* (2013.01); *G06F 40/205* (2020.01); *H04L 51/52* (2022.05)

(58) Field of Classification Search
CPC .... H04L 51/046; H04L 451/52; G06F 40/205
USPC ...................................................... 709/206
See application file for complete search history.

(56) References Cited

U.S. PATENT DOCUMENTS

| 9,043,196 | B1* | 5/2015 | Leydon | G06F 40/289 |
| | | | | 704/4 |
| 10,970,329 | B1* | 4/2021 | Al Majid | G06F 16/51 |
| 11,032,164 | B1* | 6/2021 | Rothschild | H04L 41/40 |
| 11,138,386 | B2* | 10/2021 | Chen | H04L 51/02 |
| 11,457,080 | B1* | 9/2022 | Meduri | H04L 67/60 |
| 11,563,636 | B1* | 1/2023 | Kairali | H04L 67/562 |
| 2015/0317069 | A1* | 11/2015 | Clements | G06F 3/0237 |
| | | | | 715/773 |

(Continued)

FOREIGN PATENT DOCUMENTS

WO    WO-2017006104 A1 *  1/2017    ............... G06N 3/04

OTHER PUBLICATIONS

Non-Final Office Action, Mar. 12, 2021, U.S. Appl. No. 16/684,049, 12 pages.

(Continued)

*Primary Examiner* — Anthony Mejia
(74) *Attorney, Agent, or Firm* — Fresh IP PLC; John R. Bednarz

(57) ABSTRACT

A system includes a memory and at least one processor to receive text from a client computing device, the text received one character at a time, as each character of the text is received, determine a recommendation in real-time to be added to the text based on at least one of a list of rules, word embedding, an n-gram model, and a co-occurrence model, the recommendation comprising at least one of a word, a list of hashtags, a quotation, and a list of emojis, and send the recommendation to the client computing device.

19 Claims, 7 Drawing Sheets

(56) References Cited

U.S. PATENT DOCUMENTS

| | | | |
|---|---|---|---|
| 2016/0103875 A1* | 4/2016 | Zupancic | G06F 40/20 707/773 |
| 2016/0179967 A1* | 6/2016 | Sa | G06F 16/3346 707/730 |
| 2017/0154055 A1* | 6/2017 | Dimson | G06F 16/5838 |
| 2017/0185581 A1* | 6/2017 | Bojja | G06V 30/19173 |
| 2017/0192624 A1* | 7/2017 | Wu | G06F 40/274 |
| 2017/0300462 A1* | 10/2017 | Cudworth | G06F 40/274 |
| 2017/0344224 A1* | 11/2017 | Kay | G06F 3/0482 |
| 2018/0255009 A1* | 9/2018 | Chen | G06Q 50/01 |
| 2019/0197102 A1* | 6/2019 | Lerner | G06F 3/04817 |
| 2020/0117477 A1* | 4/2020 | Aly | G06F 8/60 |
| 2020/0401645 A1* | 12/2020 | Brown | G06F 40/279 |
| 2021/0240544 A1* | 8/2021 | Ramachandran | G06F 9/262 |
| 2021/0336872 A1* | 10/2021 | Singh | H04L 45/26 |
| 2022/0014459 A1* | 1/2022 | Ganguli | H04L 67/289 |
| 2022/0121566 A1* | 4/2022 | Guim Bernat | G06F 12/0292 |
| 2022/0150666 A1* | 5/2022 | Kozhaya | H04W 64/006 |
| 2022/0224637 A1* | 7/2022 | S | H04L 63/0281 |
| 2022/0417219 A1* | 12/2022 | Sheriff | H04L 67/56 |
| 2023/0016946 A1* | 1/2023 | Wouhaybi | G06F 16/901 |
| 2023/0259415 A1* | 8/2023 | Kairali | G06F 9/547 719/328 |
| 2023/0266972 A1* | 8/2023 | Rogers | G06F 9/30087 712/214 |

OTHER PUBLICATIONS

Notice of Allowance, Jul. 13, 2021, U.S. Appl. No. 16/684,049, 12 pages.

Non-Final Office Action, Feb. 17, 2023, U.S. Appl. No. 17/388,614, 10 pages.

Notice of Allowance, Mar. 17, 2023, U.S. Appl. No. 17/388,614, 9 pages.

* cited by examiner

EMOJI RECOMMENDATION SYSTEM AND METHOD

CROSS-REFERENCE TO RELATED APPLICATIONS

This application is a continuation of U.S. patent application Ser. No. 17/388,614 filed Jul. 29, 2021, entitled "Emoji Recommendation System and Method," which is a continuation of U.S. patent application Ser. No. 16/684,049 filed Nov. 14, 2019 entitled "Emoji Recommendation System and Method," all of which are incorporated herein by reference.

BACKGROUND

Companies and businesses use social media platforms to market their products and services. Although the social media networks provide the ability to reach customers throughout the world, it can be incredibly difficult to determine when, how, and what to post. In particular, social media marketers may have to determine what to post in a variety of different languages and determine creative ways to engage potential customers. Even further complicating matters, certain social media platforms have strict rules about similarity between posts and may restrict users from posting duplicated content and/or similar posts. In certain circumstances, a user account may be suspended or even terminated if the user posts content that is overly similar. Very large companies may have an entire marketing team that can handle this task. However, this is a time consuming task and for a small business, there simply may not be enough time to determine when, how, and what to post. In addition, for a global marketer that has to create posts in English when English is not their first language, this may be nearly impossible.

It is with these issues in mind, among others, that various aspects of the disclosure were conceived.

SUMMARY

According to one aspect, a system for recommending one or more emojis includes a client computing device that sends text to a server computing device having a predictive linguistics engine. The predictive linguistics engine may provide a web service that may be a representational state transfer (REST) service. The predictive linguistics engine receives the text one character at a time, in real-time, from the client computing device. The predictive linguistics engine determines a recommendation based on the text including at least one of a word, a quotation, a hashtag, and an emoji. The server computing device may send the recommendation to the client computing device and the client computing device may display the text and the recommendation on a display in a graphical user interface (GUI). A user of the client computing device may add the recommendation to the text and post the text to at least one social media platform.

According to an aspect, a system includes a memory and at least one processor to receive text from a client computing device, the text received one character at a time, as each character of the text is received, determine a recommendation in real-time to be added to the text based on at least one of a list of rules, word embedding, an n-gram model, and a co-occurrence model, the recommendation comprising at least one of a word, a list of hashtags, a quotation, and a list of emojis, and send the recommendation to the client computing device.

According to another aspect, a method includes receiving, by at least one processor, text from a client computing device, the text received one character at a time, as each character of the text is received, determining, by the at least one processor, a recommendation in real-time to be added to the text based on at least one of a list of rules, word embedding, an n-gram model, and a co-occurrence model, the recommendation comprising at least one of a word, a list of hashtags, a quotation, and a list of emojis, and sending, by the at least one processor, the recommendation to the client computing device.

According to an additional aspect, a non-transitory computer-readable storage medium includes instructions stored thereon that, when executed by a computing device cause the computing device to perform operations, the operations including receiving text from a client computing device, the text received one character at a time, as each character of the text is received, determining a recommendation in real-time to be added to the text based on at least one of a list of rules, word embedding, an n-gram model, and a co-occurrence model, the recommendation comprising at least one of a word, a list of hashtags, a quotation, and a list of emojis, and sending the recommendation to the client computing device.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
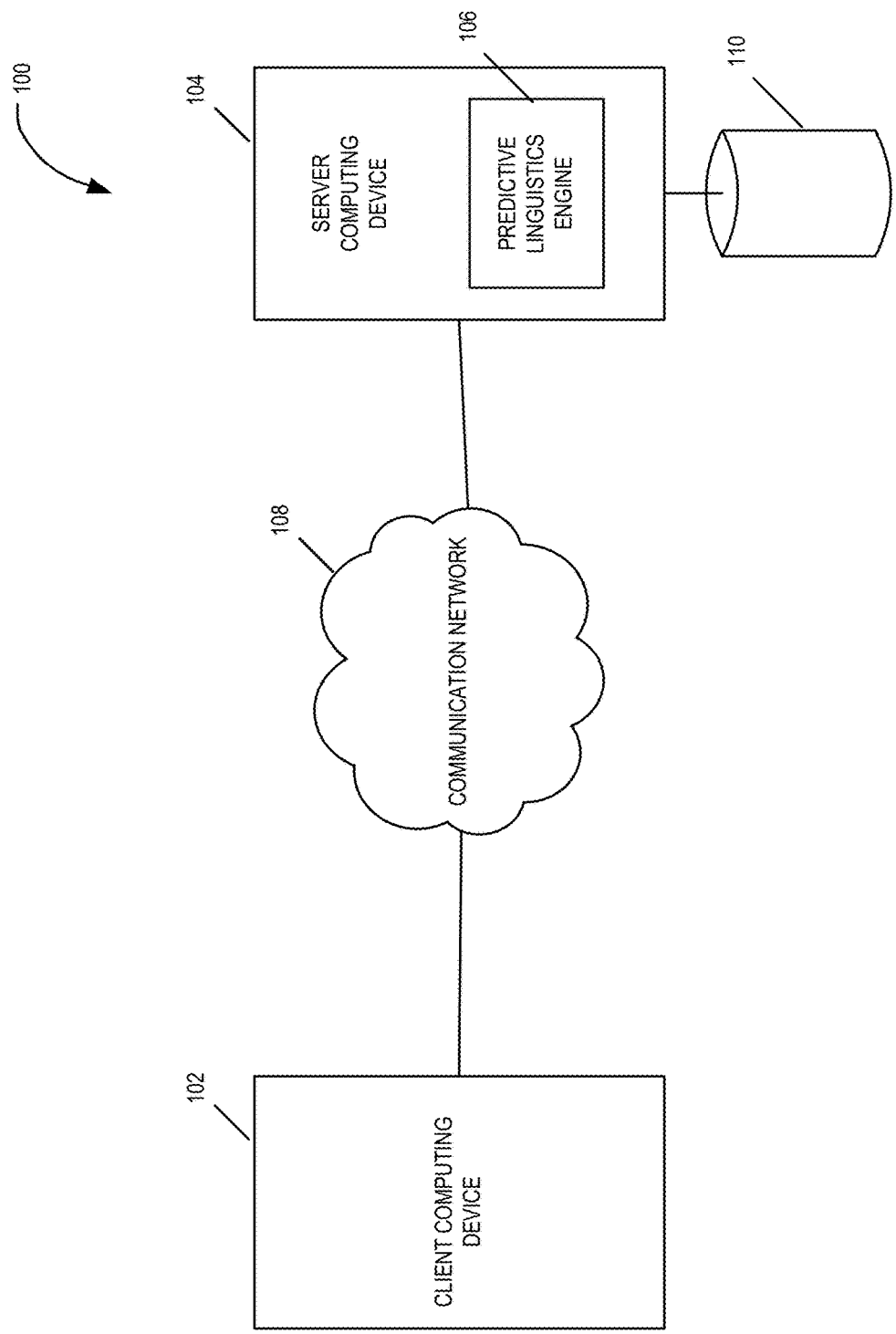
FIG. 1 is a block diagram of a system for determining a recommendation according to an example embodiment.

Aspects of a system and method for recommending one or more emojis includes a client computing device that sends text to a server computing device having a predictive linguistics engine. The predictive linguistics engine receives the text one character at a time, in real-time, from the client computing device. The predictive linguistics engine determines a recommendation based on the text as it is received including at least one of a word, a quotation, a hashtag, and an emoji. The server computing device may send the recommendation to the client computing device and the client computing device may display the text and the recommendation on a display in a graphical user interface (GUI). A user of the client computing device may add the recommendation to the text and post the text to at least one social media platform.

Emojis or emoticons originated in Japan in the late 1990s and have become popularized throughout the world during the 2010s. An emoji is a pictograph, pictorial symbol, or icon that can be presented in color and used inline in text. To a computing device, an emoji is represented as a character similar to text. Emojis may be represented by a computing device using a unique code. Emojis or emoticons originally were developed using ASCII (American Standard Code for Information Exchange), which is a character encoding standing for electronic communication. The first 128 codes of Unicode are the ASCII characters. The Unicode standard defines UTF-8, UTF-16, and UTF-32 and UTF-8 has been the most popular encoding for the internet and the World Wide Web. UTF-8 is a variable width character encoding that is able to encode each Unicode code point using one to four 8-bit bytes. UTF-8 is Unicode (Universal Coded Character Set) Transformation Format 8-bit.

Emojis have been incorporated in Unicode, which has allowed them to easily be used and standardized across different operating systems and languages. Unicode is the universal character encoding that is maintained by the Unicode Consortium. Unicode is an encoding standard that provides the basis for processing, storage, and interchange of text data in any language in all software and information technology protocols. In addition, Unicode is responsible for representing all characters for all writing systems of the world with a unique code for every character, in every language including English. Each Unicode code is conventionally represented by U+four, five, or six numbers, e.g., U+0000, which represents the null character.

722 emoji characters were incorporated into Unicode in October 2010. Since their incorporation into Unicode in 2010, emojis have continued to grow in popularity in the United States and throughout the world. There are now more than 2,500 emojis incorporated into Unicode.

Each emoji represents a way to graphically represent facial expressions, emotions, common objects, places, types of weather, and animals, among others. As a result, an emoji can be used to easily represent a thought or feeling and emojis can be universally understood by people who speak a variety of different languages. They have become so popular that the Face With Tears of Joy emoji was named Word of the Year by a dictionary in 2015. The Face With Tears of Joy emoji 😂 has a Unicode representation of U+1F602. Because they have become so popular, marketers use emojis in their social media posts. Studies have shown that social media posts that include emojis have increased engagement. However, there are thousands of emojis to choose from and it may be difficult to determine which emoji or emojis may be best to add to a social media post. Alternatively, there may be certain emojis to avoid. One or more emojis may be selected based on context of text in the social media post and current trending topics, among other information.

The studies have analyzed social media posts on social media platforms such as LINKEDIN, FACEBOOK, TWITTER, and INSTAGRAM, among others. The studies have determined that there are certain emojis that are more popular than others. In addition, certain emojis may be determined to be the most contextually relevant based on text in the social media post, a topic associated with the social media post, and a time associated with the social media post, among other information.

As an example, the server computing device and the predictive linguistics engine may provide a web application programming interface (API) that may be a Representational state transfer (REST) API that provides a web service to receive a request and provide a response. The request and the response may have a payload with a particular format such as Hypertext Markup Language (HTML), Extensible Markup Language (XML), Javascript Object Notation (JSON), or another type of format. In one example, the request may include the text and the response may be the recommendation. The request may be the following:

```
request-body =
{
"searchText": "text to be compl",
"fanOut": 2,
"depth": 2,
"ts": 1572520688734,
"showEmojisHashtags": true
}
```

The searchText may be user-entered text, fanOut may be a number of branches each node may have, depth may indicate a height of a tree starting from a parent node, ts may represent a current timestamp, and showEmojisHashtags may be a Boolean that enables or disables emoji/hashtag recommendations.

As an example, the predictive linguistics engine may determine a recommendation that may be a word that is a completion of a partially entered word. The predictive linguistics engine may generate a network graph that indicates what words, hashtags, and/or emojis may co-occur with other words and phrases. When a user has not ended a post with a space, the predictive linguistics engine may assume that the word is not complete and attempt to autocomplete the word. In one example, autocompletion may be based on the Python library autocomplete. The searchText may be completed using a library of words that may utilize conditional probability distributions and a Hidden Markov Model (HMM). The predictive linguistics engine may determine that the text includes a single string and may transform the string into a list of words and normalize each word in the string. The predictive linguistics engine may have a normalized list of words and build a frequency distribution that measures the frequency of each word to predict a final state of a partially-entered word in addition to other related words, hashtags, and emojis.

As another example, the predictive linguistics engine may complete a partially entered hashtag. The predictive linguistics engine may complete the partially entered hashtag when the text includes a word that begins with the "#" character and does not end with a space. The predictive linguistics engine may utilize a hashtag autocomplete model that includes key-value pairs from which hashtags may be selected as suggestions. Hashtags may be found in data available in real-time from one or more social media networks and each hashtag may be used to build keys in the model. As an example, if a hashtag includes n letters, there may be n-1 keys created in the model each having the hashtag as a value. For example, if the hashtag is "#dog", the model may appear as the following:

```
{
  'd': ['dog'],
  'do': ['dog']
}
```

As another example, the hashtag may include two words such as #racecar. The words may be joined together to create the hashtag. Keys will be built based on the separated words but all the keys will have the parent hashtag as their value.

Example, { 'r': 'racecar', 'ra': 'racecar', 'rac': 'racecar', 'race': 'racecar', 'c': 'racecar', 'ca': 'racecar', 'car': 'racecar',}. This way the hashtag '#racecar' is suggested not just when the user enters the starting letters of the hashtag but also when the user enters 'car'.

A sentence may be completed by the predictive linguistics engine using an n-gram model. In the model, there may be one to three gram tokens that may be stored given a corpus of data and it would be used as a base to predict a next word in a sentence.

The n-grams and next word occurrences may be stored in a database such as a NoSQL database or may be stored in memory. The keys may be the N-gram and the values may be a list of top ten to twenty occurrences. The model may be used to build grammatically correct sentences. As an example, if the predictive linguistics engine receives text such as "Did you watch the", the predictive linguistics engine may predict words that may come next in the sentence such as "game," "funny," and "soccer" and words that come after each of those words in the sentence.

The predictive linguistics engine may determine a recommendation that may be an emoji for the text including one or more user entered word, emoji, or hashtag, among other content. The predictive linguistics engine may use one or more of a list of rules, word embedding, an n-gram model, and a co-occurrence model. In one example, each emoji in the list of available emojis are Unicode emojis that may have an icon or image, an emoji name, and one or more relatable keywords.

As an example, word embedding may be based on one or more libraries that are used for natural language processing, including, but not limited to spaCy. spaCy can be used to build a natural language understanding system for the predictive linguistics engine that can use rules as well as machine learning. spaCy may perform tokenization, part-of-speech (POS) tagging, dependency parsing, lemmatization, sentence boundary detection (SBD), named entity recognition (NER), entity linking (EL), similarity, text classification, rule-based matching, training, and serialization, among others. Additionally, spaCy provides support for a number of languages including English.

If an emoji is recommended based on text that is entered that includes one or more words, it may be recommended using one or more rules. As an example, the word 'announcement' may have a list of one or more recommended emojis that are related to 'announcement': ['🎉', '🎊', '🎈', '📢']. A dictionary may map each word to a list of one or more emojis. In addition, a number of recommended emojis may be based on a fanout level.

If an emoji is recommended based on word embedding, it may be based on user entered text and emoji captions and by determining a similarity score calculated based on word vectors between the user entered text and the emoji captions. An emoji may be recommended when a similarity score is above a particular threshold. A number of recommended emojis may be based on the fanout level.

If an emoji is recommended based on an n-gram model, the model may determine one or more recommended emojis based on the user entered text and occurrence of n-grams in the n-gram model. A number of recommended emojis may be based on the fanout level.

An emoji may be recommended based on one or more emojis in the user entered text using one or more rules that include a dictionary that is mapped from one emoji to one or more related emojis. Example: {'🎉': ['🎊', '🎈', '📢']}. The dictionary may include an emoji as the key and a list of emojis as its value.

An emoji may be recommended based on another user entered emoji using word embedding. Similarity scores are computed between emoji captions (keywords) and the name of the user-typed emoji using word vectors. The score has to be above the specified threshold for being considered for recommendations. Stopwords may be exempted from being considered for emoji recommendations.

An emoji may be recommended based on another user entered emoji using a co-occurrence model that may include millions of social media posts. In one example, the millions of social media posts may be scraped using Apify or another scraping system. The data may be used to train the co-occurrence model and include a mapping from emoji to emoji. A number of recommended emojis may be based on the fanout level.

An emoji may be recommended based on a user entered hashtag using a list of one or more rules. Emoji recommendations using rules may include a dictionary mapped between hashtag to emoji. Example: {'#celebration': ['🎉', '🎊', '🎈']}.

An emoji may be recommended based on a user entered hashtag using word embedding. Similarity scores may be determined between emoji captions (keywords) and user entered hashtags using word vectors. This score has to be above the specified threshold for being considered into recommendations. Stopwords may be exempted from being considered for emoji recommendations.

An emoji may be recommended based on a user entered hashtag using a co-occurrence model that may include millions of social media posts. The data may be used to train the co-occurrence model and include a mapping from hashtag to emojis. Emoji keys may include hashtag values that may occur when the emoji has been used. A number of recommended emojis may be based on the fanout level.

A hashtag may be recommended based on user entered text that may have one or more words based on one or more rules. Example: {'morning': ['#fresh', '#sunny']}. The dictionary will contain a word as the key and a list of hashtags as its value. The number of hashtags recommended may be dependent on the fanout level.

A hashtag may be recommended based on user entered text including one or more words using an n-gram model that may be a hashtag n-gram model. The model may recommend one or more hashtags based on the user entered text by checking for occurrence of n-grams in the model. The number of hashtags recommended may be dependent on the fanout level.

A hashtag may be recommended based on user entered text including one or more emojis using one or more rules. Hashtag recommendations using rules include one or more hashtags from a dictionary that are mapped to emojis. Example: {'🎉': ['#celebration', '#success']}. The dictionary may contain an emoji as the key and a list of hashtags as its value.

A hashtag may be recommended based on user entered text including one or more emojis using a co-occurrence model that may include millions of social media posts. The data may be used to train the hashtag co-occurrence model and include a mapping between hashtag to emoji. Hashtag keys may include emoji values that occurred when the hashtag was used in posts. A number of recommended hashtags may be dependent on the fanout level.

A hashtag may be recommended based on user entered text including one or more hashtags using one or more rules. Hashtags may be selected from a dictionary mapped between hashtag to hashtag. Example: {'#morning': ['#fresh', '#sunny']}. The dictionary will contain a hashtag as the key and a list of hashtags as its value. The number of recommended hashtags may be dependent on the fanout level.

An image may be recommended based on user entered text including one or more words that may be user entered or auto-completed. The images may be recommended from a library of images by comparing the one or more words in the user entered text with names of each image. The results may be used to recommend one or more images for the user entered text. As an example, the images may be from libraries such as the Unsplash API library and/or the PyUnsplash library, among others.

The emoji recommendation system may include a memory and at least one processor to receive text from a client computing device, the text received one character at a time, and as each character of the text is received, determine a recommendation in real-time to be added to the text based on at least one of a list of rules, word embedding, an n-gram model, and a co-occurrence model, the recommendation comprising at least one of a word, a list of hashtags, a quotation, and a list of emojis, and send the recommendation to the client computing device.

FIG. 1 shows a block diagram of a computing system comprising an emoji recommendation system 100 according to an example embodiment. The emoji recommendation system 100 includes at least one client device 102 that is in communication with at least one server computing device 104 via a communication network 108. The at least one server computing device 104 may have an application or at least one component of an application shown as a predictive linguistics engine 106.

The at least one client computing device 102 is configured to receive data from and/or transmit data to the at least one server computing device 104 through the communication network 108. Although the at least one client device 102 is shown as a single computing device, it is contemplated that the at least one client computing device 102 may include multiple computing devices.

The communication network 108 can be the Internet, an intranet, or another wired or wireless communication network. For example, the communication network 108 may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one client computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the predictive linguistics engine 106. In addition, the at least one client computing device 102 further includes at least one communications interface to transmit and receive communications, messages, and/or signals.

The at least one server computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the predictive linguistics engine 106. In addition, the at least one server computing device 104 further includes at least one communications interface to transmit and receive communications, messages, and/or signals.

The at least one client computing device 102 can be a laptop computer, a smartphone, a personal digital assistant, a tablet computer, a standard personal computer, or another processing device. The at least one client computing device 102 may include a display, such as a computer monitor, for displaying data and/or graphical user interfaces. The at least one client computing device 102 may also include a Global Positioning System (GPS) hardware device for determining a particular location of the client computing device 102, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 102 may display on the display a graphical user interface (or GUI). The graphical user interface may be provided by the predictive linguistics engine 106. The graphical user interface enables a user of the at least one client computing device 102 to interact with the predictive linguistics engine 106 and create a social media post that includes text and content that may include one or more words, one or more hashtags, one or more emojis, one or more quotations, and one or more images, among other content.

The predictive linguistics engine 106 may be a component of an application and/or service executable by the at least one server computing device 104. For example, the predictive linguistics engine 106 may be a single unit of deployable executable code or a plurality of units of deployable executable code. According to one aspect, the predictive linguistics engine 106 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The emoji recommendation system 100 may also include a relational database management system (RDBMS) or another type of database management system such as a NoSQL database system that stores and communicates data from at least one database 110. The data stored in the at least one database 110 may be associated with the list of rules, word embedding, the n-gram model, and the co-occurrence models as discussed above that are used to determine the recommendation including words, hashtags, emojis, and images, among other recommendations. As an example, the database 110 may include one or more tables or data structures that may be organized to store the information associated with the database 110.

Figure 2:
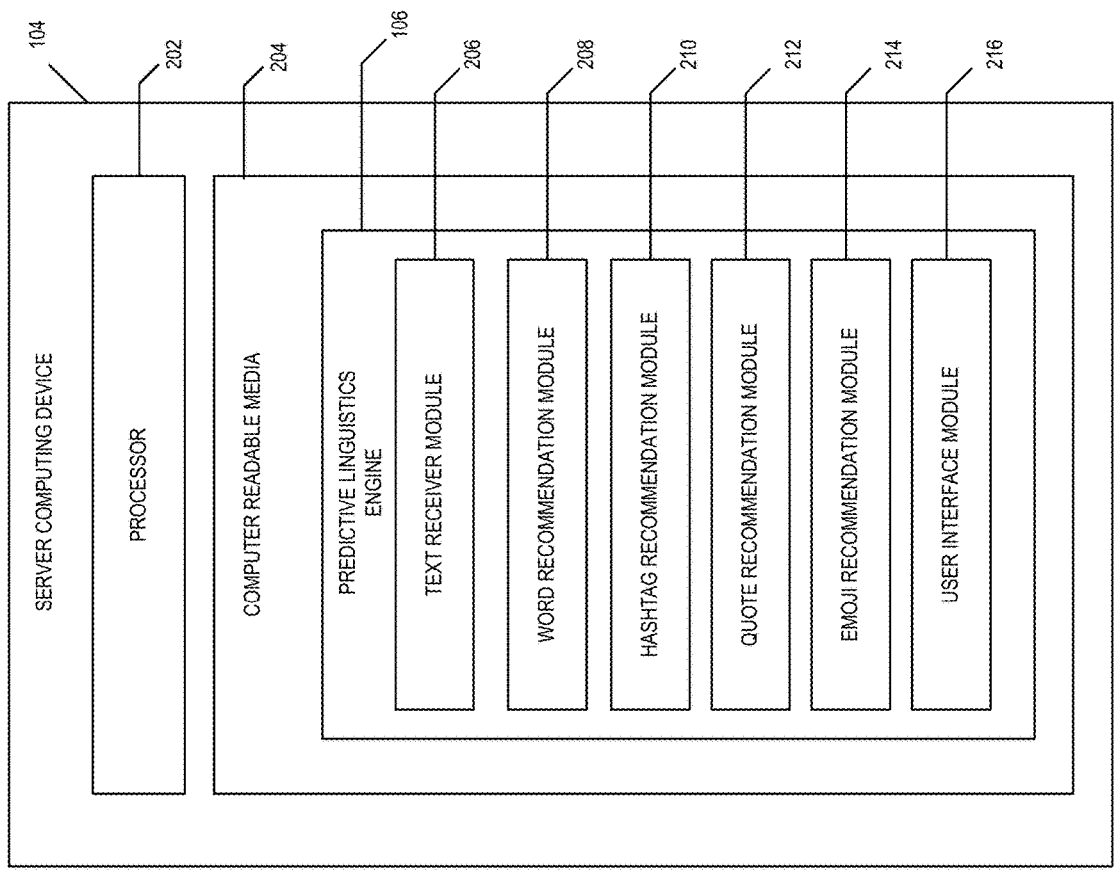
FIG. 2 shows a block diagram of a server computing device of the system according to an example embodiment.

FIG. 2 illustrates a block diagram of the server computing device 104 according to an example embodiment. The server computing device 104 includes at least one processor 202 and computer readable media (CRM) 204 in memory on which the predictive linguistics engine 106 or other user interface or application is stored. The computer readable media may include volatile media, nonvolatile media, removable media, non-removable media, and/or another available medium that can be accessed by the processor. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The predictive linguistics engine 106 may include a text receiver module 206 for receiving text from the client computing device 102. The text receiver module 206 may receive the text from the client computing device 102 one character at a time in real-time. The text receiver module 206 may receive each character of text and determine a Unicode value for each value of text as it is received. In addition, the text receiver module 206 may parse the text and determine whether each character is associated with at least one other character such that it is determined to be a word. If the text receiver module 206 finds a space then the text receiver module 206 may determine that a number of characters may represent a word. In addition, if the text receiver module 206 finds a hashtag character, the text receiver module 206 may determine that a hashtag is being received. In addition, if the text receiver module 206 finds a string of characters such as "http://", then the text receiver module 206 may determine that the string of characters is associated with a uniform resource locator (URL) or web address.

The predictive linguistics engine 106 may include a word recommendation module 208 that may determine at least one word based on the text from the client computing device 102. As an example, the word may be based on the text. The text may be a portion or subset of the word as determined by the word recommendation module 208. If a user inputs text such as "do", the word recommendation module 208 may determine at least one word such as "dog" or "done." As noted above, the word recommendation module 208 also may be used to complete a sentence or phrase that may be based on one or more words that are currently entered by the user. In one example, the word recommendation module 208 may be implemented using a Hidden Markov Model (HMM).

The word recommendation module 208 may receive a string of text that represents a large collection of English-understandable text and may transform the string into a list of words (e.g., n-grams of word length) and may normalize each word in the list of words, e.g., modify "The" to "the". Once there is a normalized list of words, the word recommendation module 208 may build a frequency distribution to measure the frequency of each word in the string of text. Using this frequency distribution and the probability that one word may follow another in the string, it is possible to predict a final state of a word in progress found in the string.

The word recommendation module 208 may complete a sentence of the at least one word in the text from the client computing device 102 using an n-gram model. The model may include one to three or even more gram tokens given a corpus of data and use this as a base to predict a probability of a next word in the text. If the n-grams are stored in a NoSQL database in database 110 or in memory of the server computing device 104, the keys may be represented by the N-gram and values may be a list of top ten or twenty occurrences of words and/or phrases that follow.

As an example, possible N-grams for an example sentence "This is my car" may be the following. 1-gram: "this", "is", "my", "car". 2-gram: "This is", "is my", "my car". 3-gram: "This is my", "is my car".

The predictive linguistics engine 106 may include a hashtag recommendation module 210 that may determine at least one hashtag based on the text from the client computing device 102. The hashtag may be determined based on one or more words in the text, one or more hashtags in the text, and one or more emojis in the text. As an example, the hashtag may be based on the text and may begin with a "#" character, which is a metadata tag that is used on social media platforms and that allows a user to tag their post such that others can find the post using the hashtag by searching for a particular hashtag. It is believed that a hashtag was first used on a social media platform in 2007 and they have exploded in popularity since their first use. The text may be a portion or subset of the hashtag as determined by the hashtag recommendation module 210. If the user inputs text such as "#do", the hashtag recommendation module 210 may determine at least one hashtag such as "#dog" or "#done." As another example, the user may input an emoji and the hashtag recommendation module 210 may recommend at least one hashtag. As another example, the user may input one or more words and the hashtag recommendation module 210 may recommend at least one hashtag. As another example, the user may input a word, an emoji, and a hashtag and the hashtag recommendation module 210 may recommend at least one hashtag. The hashtag recommendation module 210 may use at least one of a list of rules, word embedding, an n-gram model, and a co-occurrence model.

The predictive linguistics engine 106 may include a quote recommendation module 212 that may determine at least one quotation based on the text from the client computing device 102. The predictive linguistics engine 106 may determine that the text includes a uniform resource locator (URL) or web address. The URL may reference a blog post, an article, or another social media post that may have one or more quotations. The quote recommendation module 212 may parse the blog post, article, or the social media post to find the one or more quotations and allow a user to view the one or more quotations. As an example, the quotation may be "You miss 100% of the shots you don't take.—Wayne Gretzky—Michael Scott." The quote recommendation module 212 may parse content associated with the URL and find each set of matching quotation marks to identify each quotation to recommend.

The predictive linguistics engine 106 may include an emoji recommendation module 214 that may determine at least one emoji based on the text from the client computing device 102. The emoji may be determined based on one or more words in the text, one or more hashtags in the text, and one or more emojis in the text. As an example, the text may be "Wow—this product is hot! Order today!" The emoji recommendation module 214 may recommend the fire emoji and the star-struck emoji by parsing the one or more words in the text. As another example, the user may input an emoji and the emoji recommendation module 214 may recommend at least one emoji. As another example, the user may input a word, an emoji, and a hashtag and the emoji recommendation module 214 may recommend at least one emoji. The emoji recommendation module 214 may use at least one of a list of rules, word embedding, an n-gram model, and a co-occurrence model to provide the recommendation.

In addition, the predictive linguistics engine 106 includes a user interface module 216 for displaying the user interface on the display. As an example, the user interface module 216 generates a native and/or web-based graphical user interface (GUI) that accepts input and provides output viewed by users of the client computing device 102. The client computing device 102 may provide realtime automatically and dynamically refreshed information such as text associated with a social media post. The user interface module 216 may send data to other modules of the predictive linguistics engine 106 of the server computing device 104, and retrieve data from other modules of the predictive linguistics engine 106 of the server computing device 104 asynchronously without interfering with the display and behavior of the user interface displayed by the client computing device 102.

Figure 3:
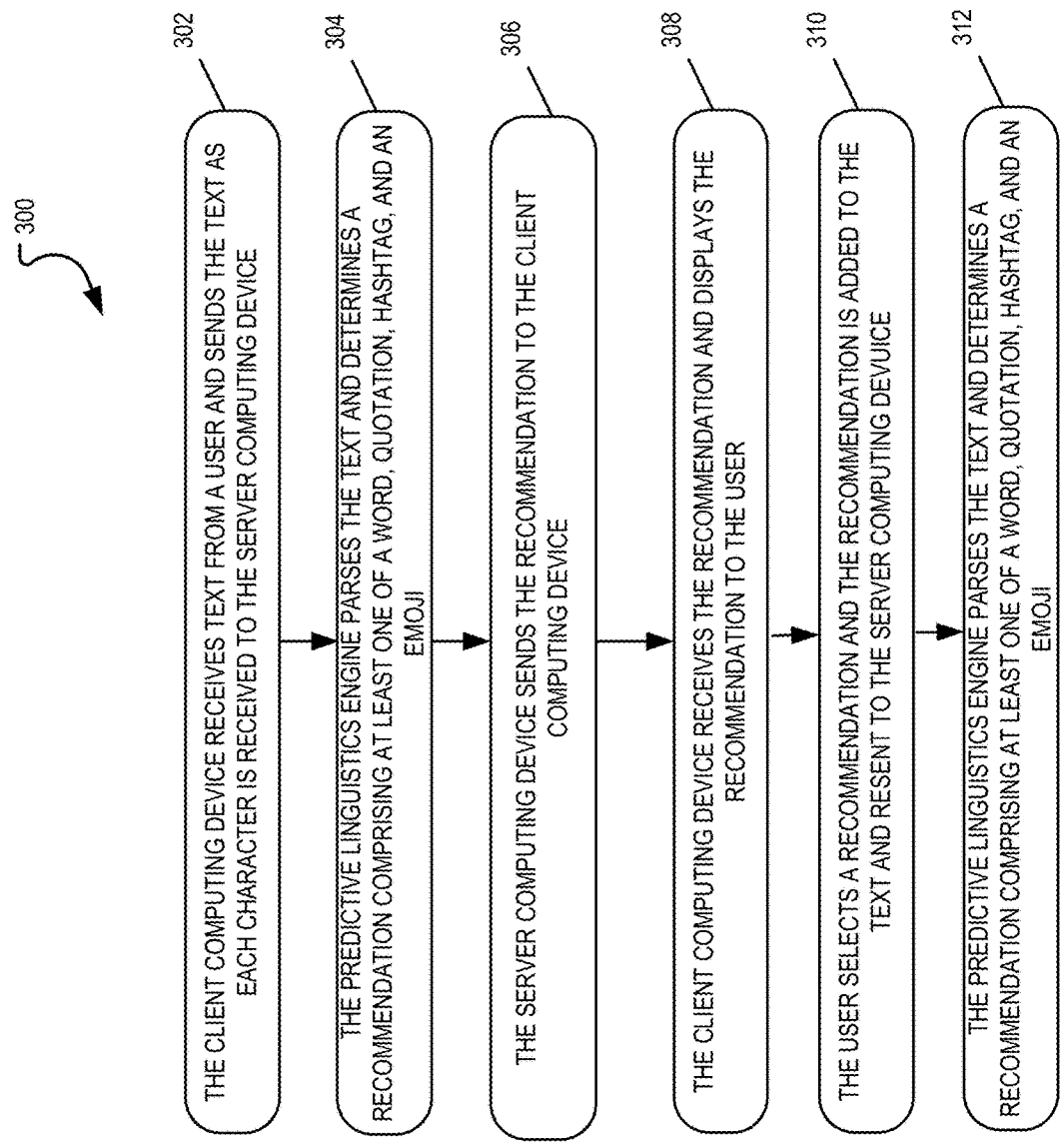
FIG. 3 illustrates a flowchart for sending a recommendation according to an example embodiment.

FIG. 3 illustrates a flowchart of a process 300 for sending a recommendation, according to an example embodiment. In step 302, the client computing device 102 receives text from a user and sends the text as each character is received to the server computing device 104. The text may be provided by an input device such as a keyboard, a mouse, a microphone, or another input device. In step 304, the predictive linguistics engine 106 of the server computing device 104 may parse the text and determine a recommendation comprising at least one of a word, a quotation, a hashtag, and an emoji. For example, each rule in the list of rules may have a recommended emoji for a list of words, at least one word in the list of words in the text. As an example, if the text includes a URL, the predictive linguistics engine 106 may parse content available at the URL and determine one or more quotations and recommend a quotation found in an article or blog post at the URL.

In step 306, the server computing device 104 sends the recommendation to the client computing device 102. In step 308, the client computing device 102 receives the recommendation from the server computing device 104 and displays the recommendation on the display for the user. In step 310, the user may select the recommendation and the recommendation may be added to the text.

When the recommendation is added to the text, the text is resent back to the server computing device 104. In step 312, the predictive linguistics engine 106 may parse the text and determine a new recommendation based on the changes to the text including the recommendation that is now present in the text. The new recommendation may comprise at least one of a word, a quotation, a hashtag, and an emoji. This process may continually occur as changes are made to the text until the user deletes the text, saves the text as a draft post, or adds the text to a post in a library of social media posts.

As an example, the predictive linguistics engine 106 may send a graphical user interface (GUI) to the client computing device 102 and display the GUI on a display of the client computing device. The GUI may show the text and the recommendation, among other information. The client computing device 102 may display the text in a text box user interface element, display the word in the text box user interface element after the text, display the list of hashtags in a hashtag user interface element, display the quotation in a quotation user interface element, and display the list of emojis in an emoji user interface element. In addition, the GUI may have a number that indicates a number of possible remaining characters for the post. The predictive linguistics engine 106 may receive a selection of an add to library user interface element on the GUI and add the text to a post to be published using at least one social media platform.

Figure 4:
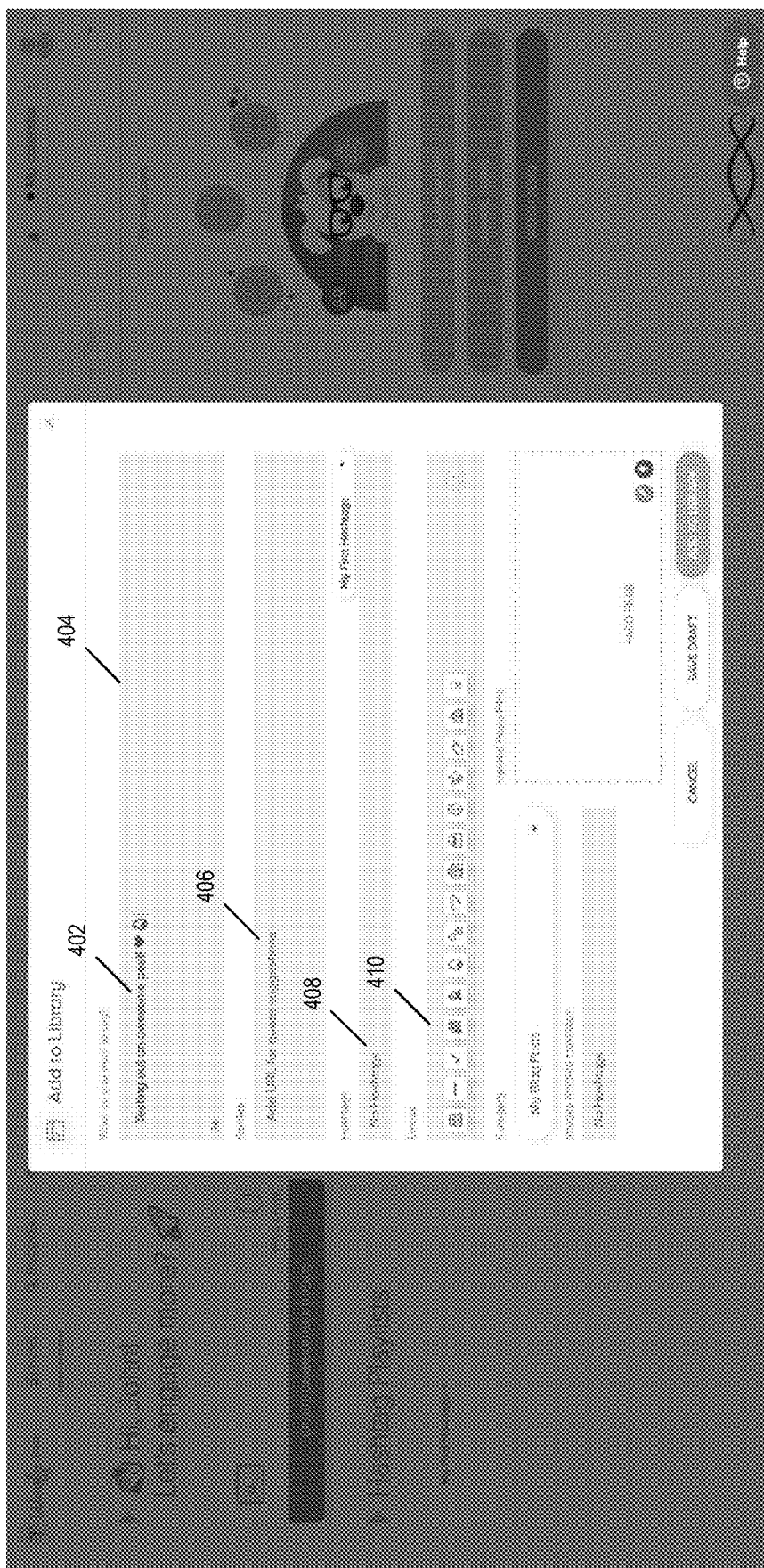
FIG. 4 illustrates an example user interface displayed by a client computing device according to an example embodiment.

FIG. 4 shows an example user interface of the predictive linguistics engine 106 displayed by the client computing device 102 according to an example embodiment. As shown in FIG. 4, the user of the client computing device 102 may provide text 402 as shown in a text entry box user interface element 404. The text 402 is "Testing out an awesome post" in addition to two emojis including a heart emoji and a fire emoji. As the user enters each character of the text 402, the client computing device 102 sends the text to the server computing device 104. As each character is received by the server computing device 104, the predictive linguistics engine 106 of the server computing device 104 may continually parse the text and continually determine a recommendation comprising at least one of a word, a quotation, a hashtag, and an emoji. As shown in FIG. 4, a quotation recommendation may be provided in a quotes user interface element 406. A hashtag recommendation may be provided in a hashtags user interface element 408. An emoji recommendation may be provided in an emoji user interface element 410.

FIG. 4 shows a number of recommended emojis. If the user selects one or more of the emojis, they may be added to the text 402 and are displayed in the text entry box user interface element 404. In addition, as the user enters the text in the text entry box user interface element 404, the predictive linguistics engine 106 may determine a word that the user is currently typing and send an autocompleted version of the word to the client computing device 102. The portion of the word not entered by the user may be displayed in a different color than the text already entered in the text entry box user interface element. As an example, if the user types "do" that may appear as black text. The predictive linguistics engine 106 may determine that the text is a partially completed word such as "dog." The "g" may be displayed as grey in the text entry box user interface element. Thus, the "do" may appear in black and the "g" may be grey. In another example, the predictive linguistics engine 106 may determine an autocompletion for a phrase or a sentence that the user may be typing.

Figure 5:
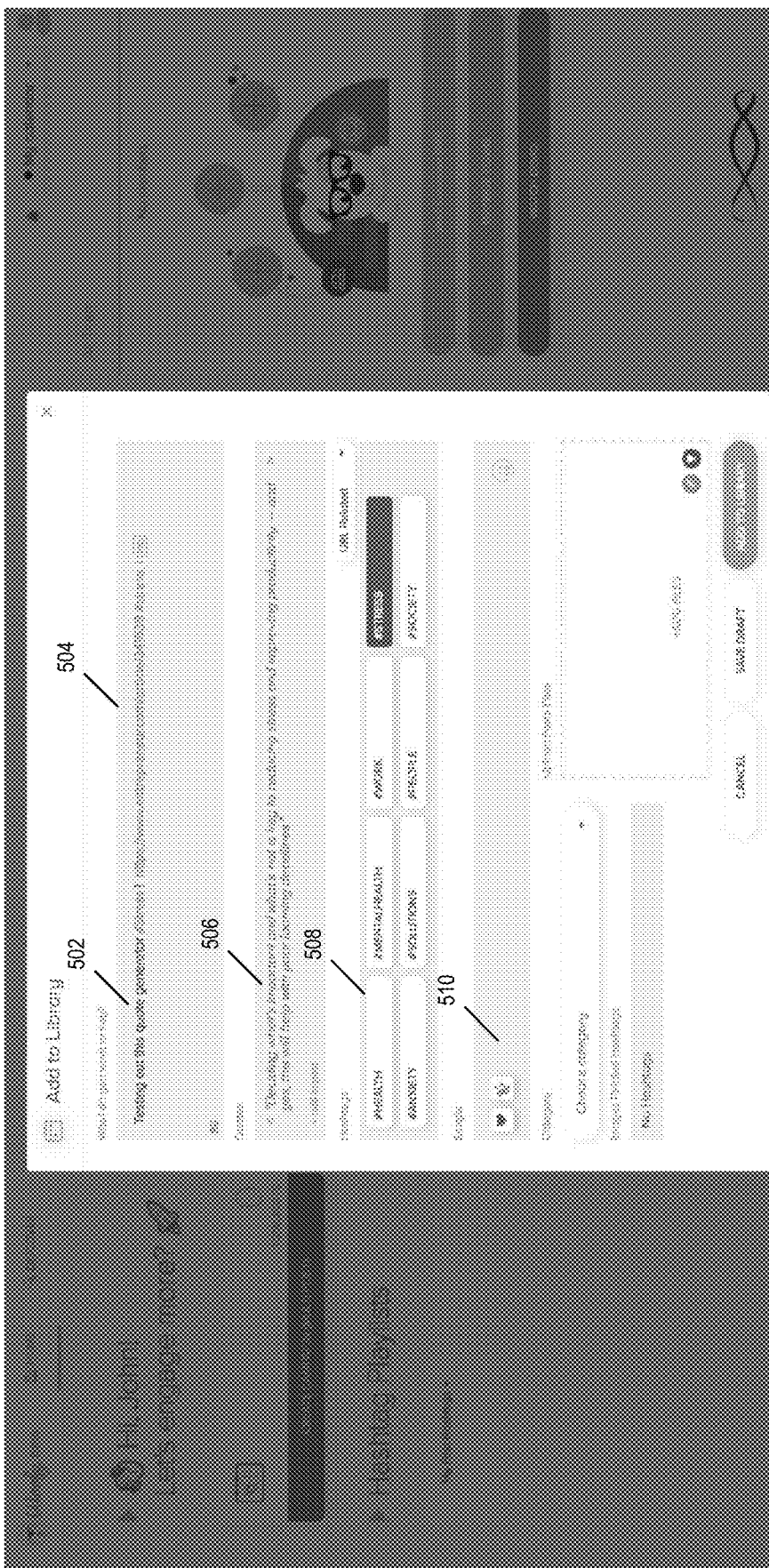
FIG. 5 illustrates an example user interface displayed by the client computing device according to an example embodiment.

FIG. 5 shows an example user interface of the predictive linguistics engine 106 displayed by the client computing device 102 according to an example embodiment. As shown in FIG. 5, the user of the client computing device 102 may provide text 502 as shown in the text entry box user interface element 504. The text 502 is "Testing out this quote generator" and a URL. The URL shown in the text 502 is an article from entrepreneur.com that is associated with stress. The user may copy and paste the URL into the text entry box user interface element 504. The predictive linguistics engine 106 of the server computing device 104 may parse the text and determine a recommendation comprising at least one of a word, a quotation, a hashtag, and an emoji.

The predictive linguistics engine 106 may determine that the URL is in the text 502 and parse content found at the URL. The content may include one or more quotations from the article. As shown in FIG. 5, the client computing device 102 may display a quotation in the quotes user interface element 506 including "Deciding what's important and what's not is key to reducing stress and improving productivity—and yes, this will help with your looming deadlines." If the user selects the quotation from the quotes user interface element 506, the quotation may be added to the text 502. The quotation shown in the quotes user interface element 506 is from the article and content at the URL. In addition, the client computing device 102 may display one or more hashtags in the hashtag user interface element 508. As shown in FIG. 5, the one or more hashtags are URL related based on text found in the content of the URL including #stress. When the user selects one of the hashtags 507 shown in the hashtag user interface element 508, the hashtag is added to the text 502. The user also may modify the list of one or more hashtags shown by selecting the "URL Related" user interface element and may display trending hashtags based on real-time data obtained from one or more social media platforms. In addition, the predictive linguistics engine 106 may determine one or more emojis related to the text including the content at the URL and display the one or more emojis in the emoji user interface element 510.

Figure 6:
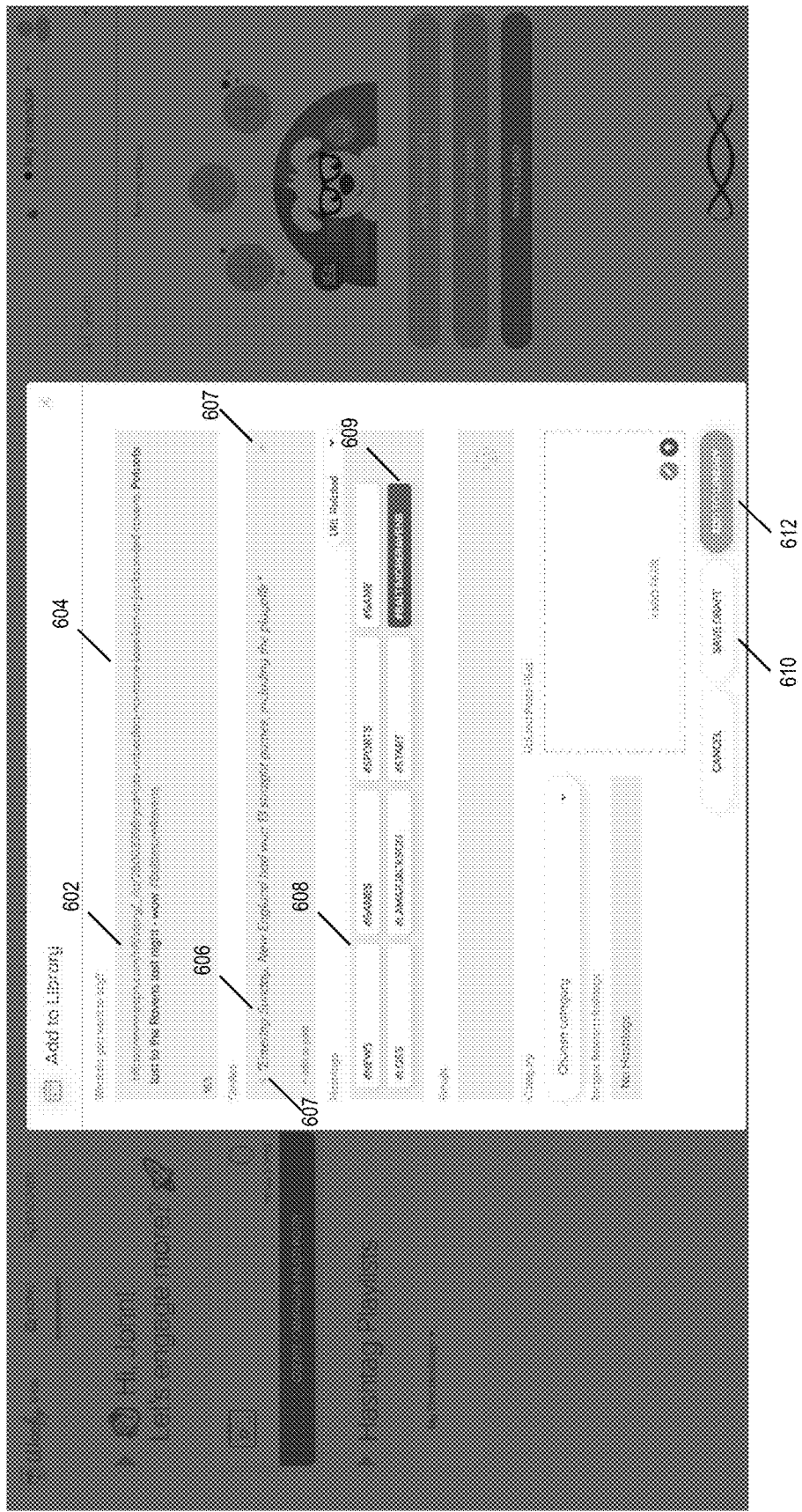
FIG. 6 illustrates an example user interface displayed by the client computing device according to an example embodiment.

FIG. 6 shows an example user interface of the predictive linguistics engine displayed by the client computing device 102 according to an example embodiment. As shown in FIG. 6, the user of the client computing device 102 may provide text 602 as shown in the text entry box user interface element 604. The text 602 includes a URL and "The Patriots lost to the Ravens last night—wow". The user may copy and paste the URL into the text entry box user interface element 604. The predictive linguistics engine 106 of the server computing device 104 may parse the text and determine a recommendation comprising at least one of a word, a quotation, a hashtag, and an emoji. The predictive linguistics engine 106 may determine that the URL is in the text 602 and parse content found at the URL. The content may include one or more quotations from the article. As shown in FIG. 6, the client computing device 102 may display a quotation in the quotes user interface element 606. As shown in FIG. 6, the quotation is "Entering Sunday, New England had won 13 straight games, including the playoffs." The quotation shown in the quotes user interface element 606 is from the article and content at the URL. If the user selects the quotation from the quotes user interface element 606, the quotation may be added to the text 602. The user could also select a user interface element 607 that when selected causes another quotation to be displayed in the quotes user interface element 606. As shown in FIG. 6, the user interface element 607 is depicted as an arrow that when selected cycles through one or more quotes from the content found at the URL. In addition, the client computing device 102 may display one or more hashtags in the hashtag user interface element 608. As shown in FIG. 6, the one or more hashtags are URL related including ##BALTIMORERAVENS. When the user selects one of the hashtags 609 shown in the hashtag user interface element 608, the hashtag 609 is added to the text 602.

When the user is done with their post, the user may select one of the user interface elements shown in FIG. 6 including a "Save Draft" user interface element 610 and an "Add to Library" user interface element 612. When the user selects the "Save Draft" user interface element 610, the post may be saved for later. When the user selects the "Add to Library" user interface element 612, the post may be scheduled to be posted to one or more social media platforms including, but not limited to, TWITTER, FACEBOOK, LINKEDIN, and INSTAGRAM.

Figure 7:
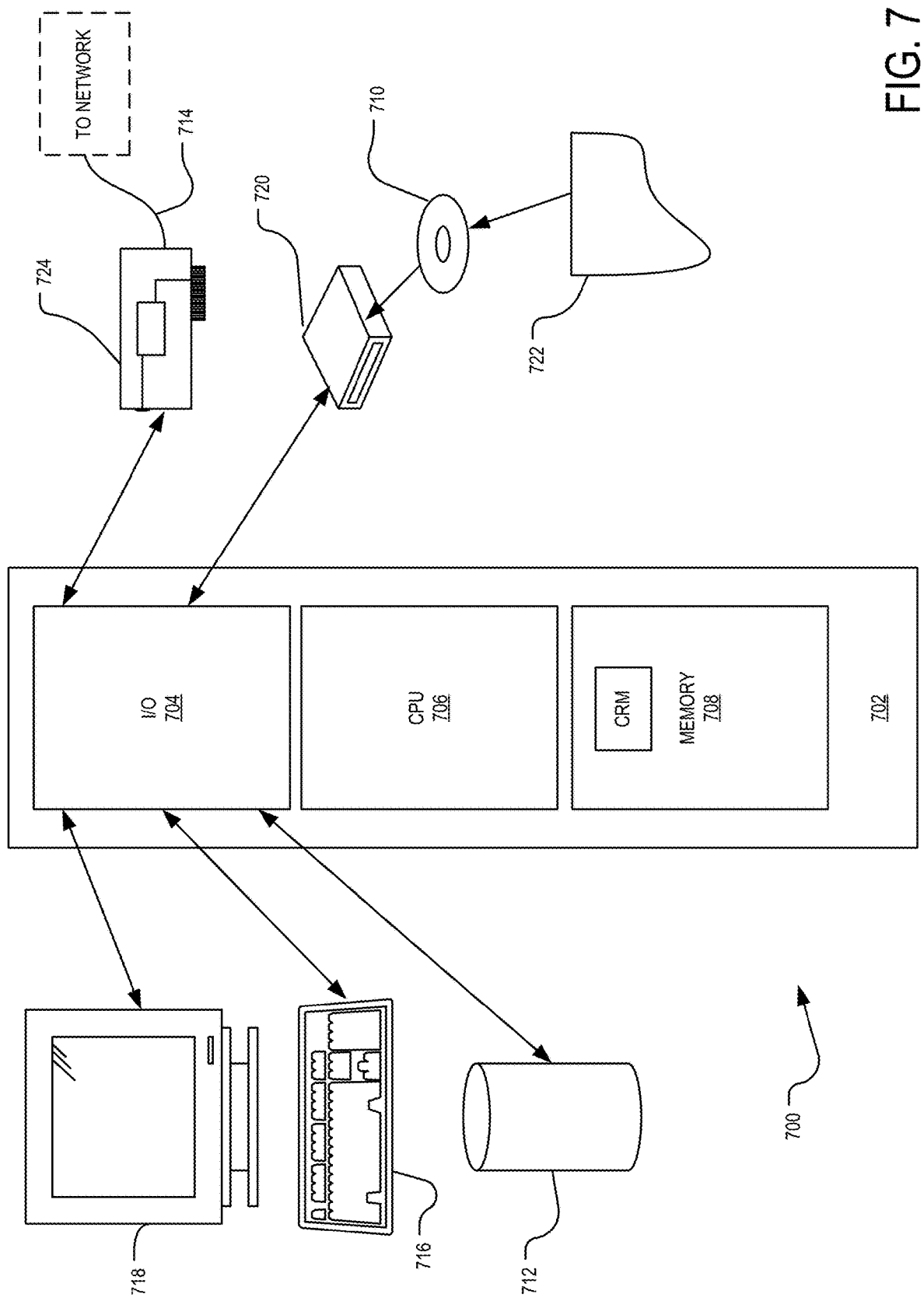
FIG. 7 illustrates a block diagram of a computing device according to an example embodiment.

FIG. 7 illustrates an example computing system 700 that may implement various systems, such as the client computing device 102 and the server computing device 104, and the methods discussed herein, such as process 300. A general purpose computer system 700 is capable of executing a computer program product to execute a computer process. Data and program files may be input to the computer system 700, which reads the files and executes the programs therein such as the predictive linguistics engine 106. Some of the elements of a general purpose computer system 700 are shown in FIG. 7 wherein a processor 702 is shown having an input/output (I/O) section 704, a central processing unit (CPU) 706, and a memory section 708. There may be one or more processors 702, such that the processor 702 of the computer system 700 comprises a single central-processing unit 706, or a plurality of processing units, commonly referred to as a parallel processing environment. The computer system 700 may be a conventional computer, a server, a distributed computer, or any other type of computer, such as one or more external computers made available via a cloud computing architecture. The presently described technology is optionally implemented in software devices loaded in memory 708, stored on a configured DVD/CD-ROM 710 or storage unit 712, and/or communicated via a wired or wireless network link 714, thereby transforming the computer system 700 in FIG. 7 to a special purpose machine for implementing the described operations.

The memory section 708 may be volatile media, nonvolatile media, removable media, non-removable media, and/or other media or mediums that can be accessed by a general purpose or special purpose computing device. For example, the memory section 708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 704 is connected to one or more user-interface devices (e.g., a keyboard 716 and a display unit 718), a disc storage unit 712, and a disc drive unit 720. Generally, the disc drive unit 720 is a DVD/CD-ROM drive unit capable of reading the DVD/CD-ROM medium 710, which typically contains programs and data 722. Computer program products containing mechanisms to effectuate the systems and methods in accordance with the presently described technology may reside in the memory section 708, on a disc storage unit 712, on the DVD/CD-ROM medium 710 of the computer system 700, or on external storage devices made available via a cloud computing architecture with such computer program products, including one or more database management products, web server products, application server products, and/or other additional software components. Alternatively, a disc drive unit 720 may be replaced or supplemented by another storage medium drive unit. The network adapter 724 is capable of connecting the computer system 700 to a network via the network link 714, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 700 is connected (by wired connection and/or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are examples of communications devices for and other means of establishing a communications link between the computers may be used.

In an example implementation, source code executed by the client computing device 102, source code executed by the server computing device 104, a plurality of internal and external databases, source databases, and/or cached data on servers are stored in memory of the client computing device 102, memory of the server computing device 104, or other storage systems, such as the disk storage unit 712 or the DVD/CD-ROM medium 710, and/or other external storage devices made available and accessible via a network architecture. The source code executed by the client computing device 102 and the server computing device 104 may be embodied by instructions stored on such storage systems and executed by the processor 702.

Some or all of the operations described herein may be performed by the processor 702, which is hardware. Further, local computing systems, remote data sources and/or services, and other associated logic represent firmware, hardware, and/or software configured to control operations of the emoji recommendation system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 702 and a user may interact with a Graphical User Interface (GUI) using one or more user-interface devices (e.g., the keyboard 716, the display unit 718, and other user-interface devices in communication with the I/O section 704) with some of the data in use directly coming from online sources and data stores. The system set forth in FIG. 7 is but one possible example of a computer system that may be employed or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a memory; and
at least one processor to:
receive text one character at a time as part of a payload having a particular format by a web application programming interface (API) provided by a predictive linguistics engine;
as each character of the text is received, determine, by the predictive linguistics engine, a recommendation in real-time to be added to the text having a similarity score above a particular threshold, the recommendation comprising at least one emoji, and based on at least one hashtag in the text; and
send, by the predictive linguistics engine, the recommendation.

2. The system of claim 1, wherein the payload comprises the text.

3. The system of claim 1, wherein the payload comprises a fanout level.

4. The system of claim 1, wherein the particular threshold is based on a list of rules.

5. The system of claim 1, wherein the particular threshold is based on word embedding.

6. The system of claim 1, wherein the particular threshold is based on an n-gram model.

7. The system of claim 1, wherein the particular threshold is based on a co-occurrence model.

8. The system of claim 1, the at least one processor further to determine the recommendation based on at least one word in the text.

9. The system of claim 1, the at least one processor further to determine the recommendation based on at least one emoji in the text.

10. The system of claim 1, the at least one processor further to display a user interface comprising at least one field to receive the text.

11. The system of claim 1, the at least one processor further to display a user interface comprising at least one text entry box.

12. The system of claim 1, the at least one processor further to receive the text at a first time and display the recommendation in response to the text at a second time after the first time.

13. The system of claim 1, the at least one processor further to display the recommendation.

14. The system of claim 1, wherein the text is displayed in a first color.

15. The system of claim 14, wherein the recommendation is displayed in a second color different from the first color.

16. The system of claim 1, wherein the text comprises at least a subset of a word and the recommendation comprises an emoji to replace the text.

17. The system of claim 1, wherein the recommendation comprises an emoji to represent and replace at least one word included in the text, the emoji based on emoji keywords associated with the at least one word.

18. A method, comprising:
receiving, by at least one processor, text one character at a time as part of a payload having a particular format by a web application programming interface (API);
as each character of the text is received, determining by a predictive linguistics engine by the at least one processor, a recommendation in real-time to be added to the text having a similarity score above a particular threshold, the recommendation comprising at least one emoji, and based on at least one hashtag in the text; and
sending, by the predictive linguistics engine by the at least one processor, the recommendation.

19. A non-transitory computer-readable storage medium, having instructions stored thereon that, when executed by a computing device cause the computing device to perform operations, the operations comprising:
receiving text one character at a time as part of a payload having a particular format by a web application programming interface (API) provided by a predictive linguistics engine;
as each character of the text is received, determining, by the predictive linguistics engine, a recommendation in real-time to be added to the text having a similarity score above a particular threshold, the recommendation comprising at least one emoji, and based on at least one hashtag in the text; and
sending, by the predictive linguistics engine, the recommendation.

* * * * *